March 5, 1963  W. B. DEAN  3,079,789

COLUMN GRIPPING MEANS

Filed March 11, 1960

INVENTOR.
Walter B. Dean
BY
Wm. R. Glasson
ATTORNEY

3,079,789
COLUMN GRIPPING MEANS

Walter B. Dean, Narberth, Pa., assignor to The Budd Company, Philadelphia, Pa., a corporation of Pennsylvania
Filed Mar. 11, 1960, Ser. No. 14,233
4 Claims. (Cl. 73—93)

This invention relates to column gripping means and has for an object the provision of improvements in this art.

One of the particular objects of the invention is to provide very simple and reliable column gripping means.

Another object is to provide column gripping means which will grip the column at any point along its length and hold securely regardless of whatever oil or other liquid there may be on the column.

Another object is to provide a grooved oil-expelling sleeve for gripping a column but one which will not fatigue or crack even with long use.

The above and other objects and various features and advantages of the invention will be apparent from the following description of an exemplary embodiment, reference being made to the accompanying drawings, wherein.

Figure 2:
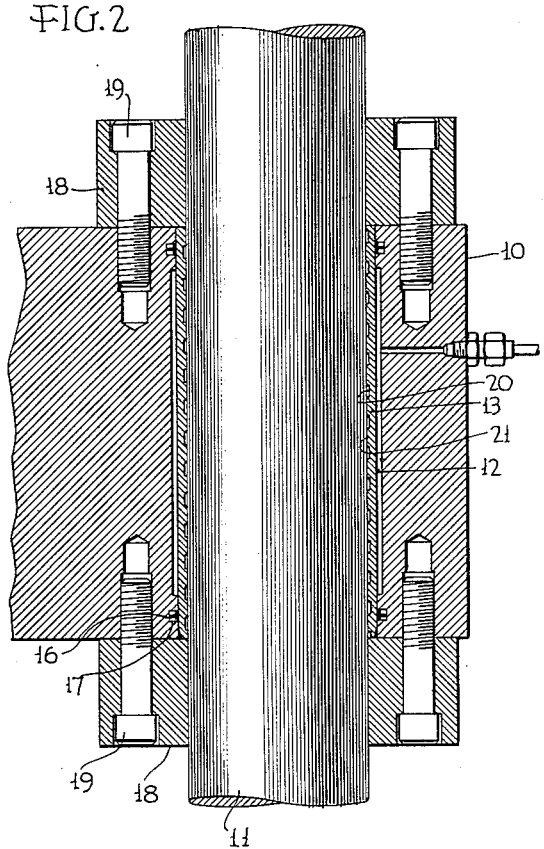
FIG. 2 is a vertical section taken in the zone 2—2 of FIG. 1.
Figure 1:
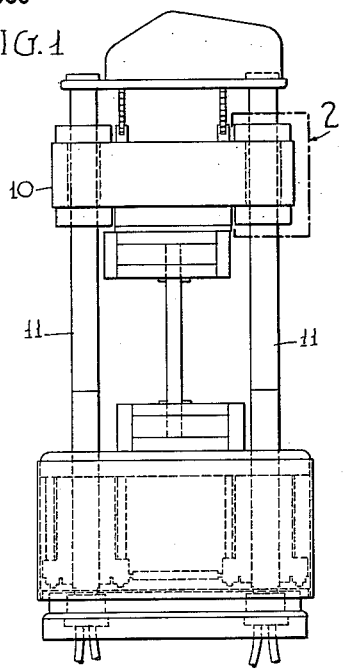
FIG. 1 is a front elevation of a testing machine having a crosshead assembly mounted on columns and held in adjusted position by column gripping means embodying the present invention.
Figure 3:
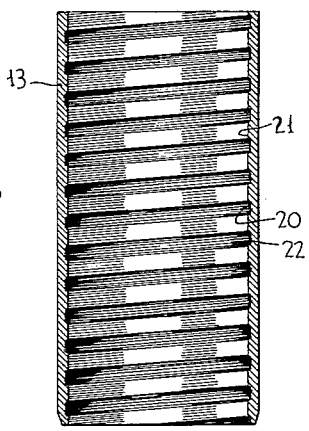
FIG. 3 is an enlarged inside elevation of a gripping sleeve.
Figure 4:
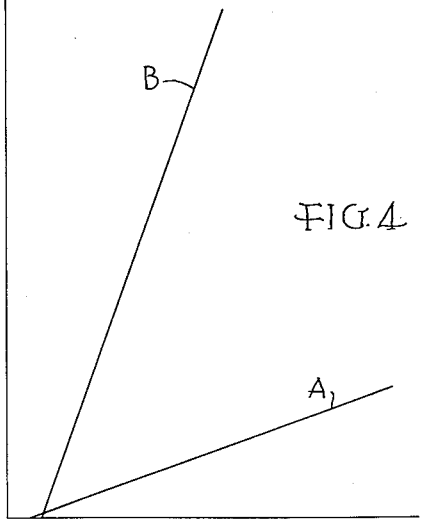
FIG. 4 is a diagram showing the effectiveness of a grooved sleeve as compared to a plain metal sleeve.

As shown in the drawings, a crosshead 10, as of a testing machine, is adapted to move along a plurality of columns 11, one of which is shown in FIG. 2. This general type of testing machine and one type of fluid-actuated column gripping means are shown in the copending application of John C. McClelland, Serial No. 721,384, filed March 14, 1958, now Patent No. 2,999,382.

The crosshead is formed with an annular chamber 12 completely surrounding the column. A circumferentially complete imperforate metal sleeve 13 is disposed at the inner part of this annular chamber or channel, leaving an outer annular fluid chamber space extending over the greater part of the length of the sleeve. The space between the sleeve and the column is very small, for example between 0.002" and 0.004" on each side.

The sleeve 13 is laterally flexible so as to be adapted to be squeezed in radially to a smaller interior diameter to grip the column and is axially rigid so as to take the extremely large axial loads imposed in use. As an example, the column may be of steel of 5.995" diameter and the sleeve may be 6.0015" I.D. and 6.499" O.D., the wall thus being 0.24875" thick. Manganese bronze is one material which has proved satisfactory for the sleeve. Its modulus is sufficiently high to take the end loads without buckling and yet sufficiently low to take the bending loads without fatiguing. It is also has a high coefficient of friction to resist slippage along the column.

Means are provided for sealing the space around the sleeve, the means herein provided comprising annular sealing rings 16 in grooves 17 surrounding the column. The sealing rings are of a type which increase in effectiveness as the pressure of the fluid behind them increases. Care is taken to avoid injuring the sealing rings when the sleeve is inserted. A tapered lead ring (not shown) is useful for this purpose.

Means are provided for supporting the ends of the sleeve to resist axial movement. The means herein shown comprise abutment rings 18 engaging the ends of the sleeve and firmly secured to the crosshead by cap bolts 19.

The sleeve thus mounted and supported will provide a tremendous gripping pressure on the column compared to the pressure of the fluid applied to the sleeve. However, the columns are usually covered with a film of oil. This is intentionally present to provide good sliding movement of the crosshead during adjustment travel and to prevent rusting; but the amount may be increased by slight leakage from behind the sleeve (oil being the preferred pressure fluid) especially during adjustment of travel when the sealing rings are not under pressure.

If friction lining is used the slippage due to the oil coating is not too troublesome but such friction material is compressible and not very suitable for use inside a continuous imperforate sleeve because the total change in diameter of the sleeve is very small. It is therefore desirable to obtain a direct metal-to-metal gripping engagement between the sleeve and the column. The dry friction of metal-to-metal contact would be more than adequate for the purposes, short of damage or marring of the surfaces of either the sleeve or the column; but, as stated, an oil coating is always interposed and tends to be entrapped so that it is not squeezed out of a plain sleeve no matter how great the applied pressure. FIG. 6 at curve A shows the low efficiency and uncertain action of a smooth surfaced sleeve.

According to the present invention this difficulty is overcome by providing grooves inside the sleeve which open to the ends of the sleeve. The grooves 20, as here shown, are very shallow, say 0.020" deep, and relatively wide, say 0.450" as compared to a width of 0.675" for the intervening lands 21. The lands need to be as wide as practicable so as to provide an extensive gripping area and to avoid marring the column. The relative groove and land areas are nearly equal, with the area of the lands being greater. The edges of the grooves merge gradually toward the lands, being inclined, as shown at 22, to avoid lines of fatigue breakage.

The grooves open to the ends of the sleeve, as stated, for the outflow of excess oil. For effectiveness and ease of formation the grooves are made spiral or helical with a very flat pitch.

Curve B in FIG. 6 shows the very great increase in gripping effect which is secured by providing the grooves inside the sleeve. The comparable axial holding resistance of plain and grooved sleeves for the same pressures of the radially acting gripping fluid are shown by the following tabulation:

| Gripping pressure, p.s.i. | Breakaway load, lbs. | |
|---|---|---|
| | Plain A | Grooved B |
| 1,000 | 2,000 | 2,000 |
| 2,000 | 9,000 | 59,000 |
| 3,000 | 17,000 | 116,000 |
| 4,000 | 23,000 | 172,000 |
| 5,000 | 30,000 | 225,000 |
| 6,000 | 37,000 | 280,000 |

It is thus seen that in spite of the great reduction in total contact area between the sleeve and the column, the grooved sleeve gave a most unexpectedly high increase in gripping resistance. The continuous walled sleeve is thus made to form a very satisfactory column grip without any interposed friction lining and without any cutting to increase its flexibility. The gripping device is very simple and inexpensive and easy to manufacture, install and service.

While one embodiment of the invention has been described for purposes of illustration, it is to be understood that there may be various embodiments and modifications within the general scope of the invention.

What is claimed is:

1. Column gripping means comprising in combination with a column and a crosshead movable therealong and adapted to be gripped to the column at any point along the length thereof, means on said crosshead forming an annular fluid chamber around said column, a continuous imperforate sleeve extending completely around the column and closing the inner side of said annular fluid chamber, annular ring seals around said sleeve near its ends to seal the chamber space at the sleeve, and means for supplying and exhausting fluid to and from said chamber, said sleeve being axially rigid and radially flexible and having spaced wide smooth-faced integral lands and shallow wide recesses between lands on its inner surface for gripping the column.

2. Column gripping means as set forth in claim 1, wherein said lands and recesses are nearly equal in area with the land area being larger.

3. Column gripping means as set forth in claim 1, wherein said lands and recesses are formed helically and extend from end-to-end of the sleeve.

4. Column gripping means as set forth in claim 3, wherein for a steel column said sleeve is formed of a metal having a lower modulus such as manganese bronze and wherein the grooves are about 0.450" wide and about 0.020" deep and said lands are about 0.675" wide, the edges of the grooves being tapered to the lands.

References Cited in the file of this patent
UNITED STATES PATENTS

| | | |
|---|---|---|
| 2,720,735 | Ruehl et al. | Oct. 18, 1955 |
| 2,884,475 | Foyn | Apr. 28, 1959 |
| 2,897,599 | Kamatani | Aug. 4, 1959 |
| 2,920,895 | Krouse | Jan. 12, 1960 |
| 2,921,108 | Meffert | Jan. 12, 1960 |